1

3,232,952
DI-(OXAZOLIDINONE-(4)-N-ALKYL)-ETHERS
Wolfgang Seeliger, Marl, Kreis Recklinghausen, Germany, assignor to Chemische Fabrik Kalk G.m.b.H., Cologne-Kalk, Germany
No Drawing. Filed Sept. 20, 1963, Ser. No. 310,480
3 Claims. (Cl. 260—307)

The present invention relates to novel di-(oxazolidinone-(4)-N-alkyl)-ethers and a process for their production.

Aliphatic alcohols can be converted to ethers at 100 to 140° C. in the liquid phase in the presence of an acid catalyst. When such temperature range is exceeded a considerably reduced yield of ether is obtained as the alcohols used as starting materials are dehydrated to the corresponding unsaturated hydrocarbons to an increased extent at temperatures above 140° C.

Attempts to convert N-β-hydroxy-ethyl-oxazolidinone-(4) compounds and especially N-β-hydroxy-ethyl-2,2,5,5-tetra-alkyl-oxazolidinone compounds under these conditions into the di-(oxazolidinone-4-N-alkyl)-ethers resulted only in a most unsatisfactory yield.

Unexpectedly it was found that di-oxazolidinone-(4)-N-alkyl)-ethers could be obtained in a liquid phase reaction in good yields by heating a mixture of a N-β-hydroxy-alkyl-oxazolidinone-(4) and small quantities of an acid catalyst to temperatures of 150–250° C. at atmospheric or reduced pressure until no further water is driven out of the reaction mixture.

All N-β-hydroxy-alkyl-oxazolidinone-(4) compounds which are liquid under the conditions of the reaction can be used as starting materials for the preparation of the compounds according to the invention.

Preferably, such starting materials are N-β-hydroxy-alkyl-oxazolidinone-(4) compounds carrying two hydrocarbon substituents such as lower alkyl on the carbon atom in position 2 and expediently also on the carbon atom in position 5. Such starting N-β-hydroxy-alkyl compounds can be prepared from the corresponding oxazolidinone-(4) compounds by their reaction in an inert solvent, such as glycerine or xylene with alkylene oxides, preferably, lower ethylene oxides such as ethylene oxide, at temperatures between 80 and 200° C. in the presence of small quantities of alkaline reacting substances such as alkali metal hydroxide or alkali metal salts of oxazolidinones.

As acid catalysts those commonly employed for the production of ethers, such as, for example, sulfuric acid or phosphoric acid or their acid salts can be employed in the process according to the invention. However, sodium and potassium bisulfate which advantageously are used in extremely finely divided form have proved especially suited. The quantity of catalyst employed depends essentially upon the structure of the alcohol to be etherified. For example, for the conversion of N-hydroxy-ethyl-2,2,5,5-tetramethyl-oxazolidinone-(4) the addition of 1 to 10% by weight based upon the entire reaction mixture of the bisulfates indicated suffices.

To produce the ethers the reaction mixture consisting of the N-β-hydroxy-alkyl-oxazolidinone compound and the catalyst is heated to 150 to 250° C. at atmospheric pressure or advantageously under reduced pressure (which, however, is still greater than the vapor pressure of the starting oxazolidinone compound or the diether produced

2 therefrom at the temperature employed) whereby the water produced by the ether formation distills off. The heating is continued until no further water distills off. Thereafter the ether produced is distilled out of the reaction mixture. It generally is not necessary for this purpose to remove or neutralize the catalyst before such distillation. Such distillation also is advantageously carried out under reduced pressure. Despite the harsh reaction conditions which are characteristic for the process according to the invention, dehydration of the starting alcohol to the corresponding unsaturated compounds only occurs to a slight extent. In addition, unexpectedly, the oxazolidinone group is not attacked in any way under such reaction conditions.

The ethers produced according to the invention can be used as plasticizers in synthetic resins such as polymethyl methacrylates, polystyrene, polyvinyl chloride, as well as in chlorinated rubber and as emulsifiers or as solution promoters. In addition, the products can also be used as inert polarizing solvents having a very high boiling point.

The following example is illustrative of the invention.

*Example*

50 parts by weight of N-hydroxy-ethyl-2,2,5,5-tetramethyl-oxazolidinone-(4) were mixed with 3 parts by weight of finely powdered potassium bisulfate and heated under a pressure of 135 torr to a temperature of 200° C. The reaction mixture was maintained at this temperature until no further water distilled off. Thereafter, at a pressure of 12 torrs, 36.6 parts by weight (81% of theory) of the di - (2,2,5,5 - tetramethyl-oxazolidinone-(4)-N-ethyl)-ether with a boiling point of 227–230° C. were distilled off. The melting point of the distilled product was between 71–73° C.

Analysis of the product gave the following values:

| | Calculated, percent |
|---|---|
| C | 60.64 |
| H | 9.05 |
| N | 7.86 |

| | Found, percent |
|---|---|
| C | 60.30 |
| H | 9.36 |
| N | 8.05 |

I claim:
1. A compound of the formula

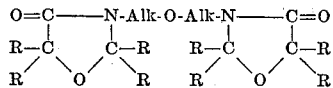

wherein each of R is lower alkyl and Alk is a lower alkylene having two carbon atoms in the chain connecting the nitrogen and the oxygen atoms to which it is attached.

2. A compound according to claim 1 in which Alk is ethylene.

3. Di - (2,2,5,5 - tetramethyl - oxazolidinone-(4)-N-ethyl)-ether.

References Cited by the Examiner

Migrdichian, V.: Organic Synthesis, vol. 1, New York, Reinhold Publishing Corp., 1957.

NICHOLAS S. RIZZO, *Primary Examiner.*

R. J. GALLAGHER, *Assistant Examiner.*